(12) United States Patent
Singhal et al.

(10) Patent No.: US 10,339,148 B2
(45) Date of Patent: Jul. 2, 2019

(54) CROSS-PLATFORM COMPUTER APPLICATION QUERY CATEGORIES

(71) Applicant: Microsoft Technology Licensing, LLC, Redmond, WA (US)

(72) Inventors: Aman Singhal, Bellevue, WA (US); Marcelo M. De Barros, Redmond, WA (US); Manish Mittal, Redmond, WA (US); Siddharth S. Shenoy, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 139 days.

(21) Appl. No.: 15/220,761

(22) Filed: Jul. 27, 2016

(65) Prior Publication Data
US 2018/0032522 A1     Feb. 1, 2018

(51) Int. Cl.
| G06F 17/30 | (2006.01) |
| G06F 16/2457 | (2019.01) |
| G06F 16/2455 | (2019.01) |
| G06F 16/903 | (2019.01) |

(52) U.S. Cl.
CPC .... *G06F 16/24578* (2019.01); *G06F 16/2455* (2019.01); *G06F 16/903* (2019.01)

(58) Field of Classification Search
USPC .................................................. 707/769, 723
See application file for complete search history.

(56) References Cited

U.S. PATENT DOCUMENTS

| 7,490,317 B1 * | 2/2009 | Hahn ...................... G06F 8/433 717/121 |
| 8,700,624 B1 | 4/2014 | Pragada et al. |
| 8,762,360 B2 | 6/2014 | Jiang et al. |
| 8,868,692 B1 | 10/2014 | Khanna et al. |

(Continued)

FOREIGN PATENT DOCUMENTS

| EP | 1612704 A1 | 1/2006 |
| WO | WO2006012467 A1 | 2/2006 |
| WO | WO2014031044 A1 | 2/2014 |

OTHER PUBLICATIONS

Gumaste, Prasad, "Google rolls out a new, colorful app search results layout on mobile", Published on: Aug. 31, 2015, 3 Pages.

(Continued)

*Primary Examiner* — Hung T Vy
(74) *Attorney, Agent, or Firm* — Goff IP Law PLLC; Jared S. Goff

(57) ABSTRACT

A limited first set of search engine results can be retrieved from running an application query, with the limited first set of results being limited to applications associated with a first set of application platform(s). Categories of applications referenced in the limited first set of results can be identified, and a category stamp can be generated for the query based on applications in the first set of results that are associated with each of multiple categories. A limited second set of search engine results can be retrieved from running the query. The limited second set of results can be limited to applications associated with a second set of application platform(s), with the second set of results being limited to applications in a category corresponding to the category stamp for the query. An application list for the query can be generated using the limited second set of results.

20 Claims, 7 Drawing Sheets

(56) References Cited

U.S. PATENT DOCUMENTS

| | | |
|---|---|---|
| 9,015,702 B2 | 4/2015 | Bhat |
| 9,063,811 B2 | 6/2015 | Stekkelpak et al. |
| 9,069,584 B2 | 6/2015 | Shelansky et al. |
| 9,092,527 B2 | 7/2015 | Shapira et al. |
| 9,201,946 B2 | 12/2015 | Shapira et al. |
| 9,881,050 B2 | 1/2018 | Chervirala et al. |
| 2005/0138014 A1 | 6/2005 | Bhasker et al. |
| 2010/0325133 A1* | 12/2010 | Rounthwaite ......... G06F 16/951 707/759 |
| 2011/0093488 A1 | 4/2011 | Amacker et al. |
| 2012/0124062 A1 | 5/2012 | Macbeth et al. |
| 2012/0143898 A1* | 6/2012 | Bruno ....................... G06F 8/30 707/769 |
| 2012/0191694 A1 | 7/2012 | Gardiol et al. |
| 2012/0198436 A1 | 8/2012 | Preimesberger et al. |
| 2012/0222025 A1 | 8/2012 | Pandit |
| 2012/0227061 A1 | 9/2012 | Hunt et al. |
| 2012/0240236 A1* | 9/2012 | Wyatt ................... G06F 21/564 726/25 |
| 2012/0316955 A1 | 12/2012 | Panguluri et al. |
| 2013/0290318 A1 | 10/2013 | Shapira et al. |
| 2013/0290319 A1 | 10/2013 | Glover et al. |
| 2013/0290322 A1 | 10/2013 | Prosnitz et al. |
| 2013/0325892 A1 | 12/2013 | Edwards et al. |
| 2014/0006409 A1 | 1/2014 | Prosnitz et al. |
| 2014/0067846 A1 | 3/2014 | Edwards et al. |
| 2014/0108451 A1 | 4/2014 | Lee et al. |
| 2014/0195524 A1 | 7/2014 | Raichelgauz et al. |
| 2014/0214898 A1 | 7/2014 | Shapira et al. |
| 2014/0297700 A1 | 10/2014 | Vongsouvanh et al. |
| 2014/0358734 A1* | 12/2014 | Sehgal ................... G06F 8/654 705/27.1 |
| 2014/0379747 A1 | 12/2014 | Majumder et al. |
| 2015/0006328 A1 | 1/2015 | Yoon et al. |
| 2015/0039580 A1 | 2/2015 | Subhedar |
| 2016/0085868 A1 | 3/2016 | Young et al. |

OTHER PUBLICATIONS

Briggs, Justin, "Everything You Need to Know About Mobile App Search", Published on: Feb. 17, 2015, 31 Pages.

Rasthofer, et al., "DroidSearch: A Tool for Scaling Android App Triage to Real-World App Stores", In Proceedings of Science and Information Conference, Jul. 28, 2015, pp. 247-256.

"International Search Report and Written Opinion Issued in PCT Application No. PCT/US2017/042297", dated Sep. 15, 2017, 11 Pages.

Alemzadeh, et al., "An Efficient Method for Tagging a Query with Category Labels Using Wikipedia towards Enhancing Search Engine Results", In Proceedings of the ACM International Conference on Web Intelligence and Intelligent Agent Technology (WI-IAT), Aug. 31, 2010, 4 Pages.

"International Search Report and Written Opinion Issued in PCT Application No. PCT/US2017/042295", dated Oct. 5, 2017, 11 Pages.

"International Search Report and Written Opinion Issued in PCT Application No. PCT/US2017/042296", dated Aug. 31, 2017, 13 Pages.

Singhal, et al., Platform Support Clusters From Computer Application Metadata, U.S. Appl. No. 15/221,118, filed Jul. 27, 2016, 50 Pages.

Singhal, et al., "Computer Application Query Suggestions", U.S. Appl. No. 15/221,043, filed Jul. 27, 2016, 49 Pages.

Non-Final Office Action, U.S. Appl. No. 15/221,118, filed Jul. 27, 2016, Office Action Notification dated May 24, 2018, 9 Pages.

"Non-Final Office Action Issued in U.S Appl. No. 15/221,043", dated Sep. 4, 2018, 14 Pages.

\* cited by examiner

CROSS-PLATFORM COMPUTER APPLICATION QUERY CATEGORIES

BACKGROUND

Online application stores make applications available for download and installation. Such online application stores sometimes provide metadata regarding the applications to be downloaded. For example, such metadata may include a natural language description of an application. The metadata may also include natural language user reviews for an application, which can be provided by users through the online store or through other avenues. Online stores often provide each application with an application site that includes descriptions for the application, user reviews for the application, and additional features such as a control that can be selected for downloading and/or installing the application.

Online stores have also provided features that facilitate finding applications. Such features can be valuable, especially as the numbers of applications in some online application stores has increased dramatically in recent years. For example, online stores may provide search results in response to queries entered as user input from user profiles on the online stores.

Search engine providers outside the online stores have also included searching features to facilitate finding applications in online stores. For example, search engine providers have indexed the application sites on online stores, so that such sites can be provided in traditional Web search results. Search engines may also provide more targeted answers to application queries, which may be limited in certain respects, such as limited to applications from an online store that provides applications that are supported by the type of device from which the application query was sent. As an example, a search engine may receive and respond to a category application query, which is a query requesting a category of applications (such as a query for search applications, or flashlight applications).

SUMMARY

The tools and techniques discussed herein relate to cross-platform computer application query categories. In one aspect, the tools and techniques can include accessing a category application query. Also, a limited first set of search engine results can be retrieved from running the query, with the limited first set of results being limited to applications associated with a first set of one or more computer application platforms. Categories associated with applications referenced in the limited first set of results can be identified, and a category stamp can be generated for the query. The generating of the category stamp can include generating and comparing scores that are based at least in part upon quantities of applications in the limited first set of results that are associated with each of multiple categories. A limited second set of search engine results can be retrieved from running the query. The limited second set of results can be limited to applications associated with a second set of one or more application platforms, and the limited second set of results can be limited to applications in a category corresponding to the category stamp for the query. An application list for the query can be generated using the limited second set of search engine results, with the application list including references to applications from the limited second set of search engine results for the query.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
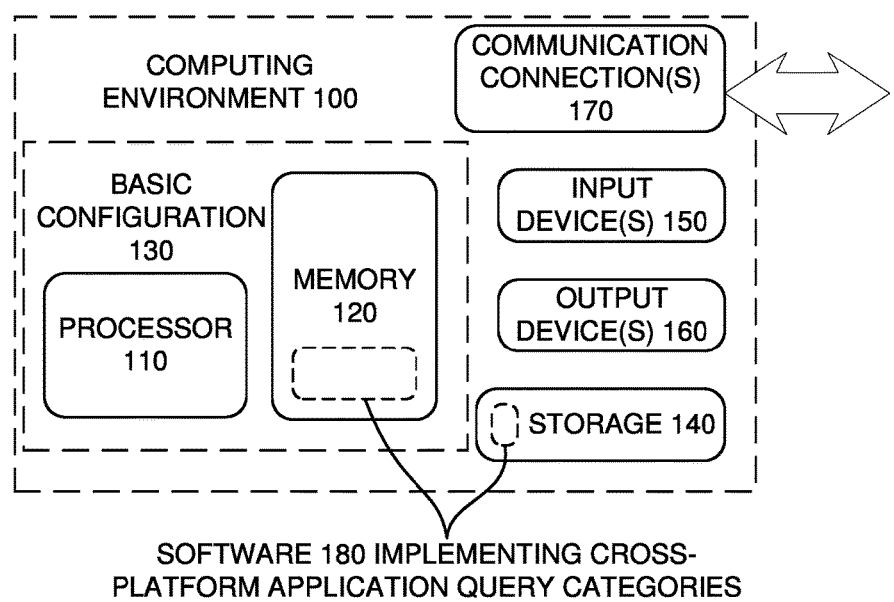
FIG. 1 is a block diagram of a suitable computing environment in which one or more of the described aspects may be implemented.

Aspects described herein are directed to techniques and tools for improved category application searching features in computer systems. Such improvements may result from the use of various techniques and tools separately or in combination.

Such techniques and tools may include stamping category application queries with custom categories using search results from a first platform set in such a way that the stamped queries can be used on other platforms to filter applications listed in relevant search results on the other platforms and to serve the results to user profiles. The technique can use search results from a mainstream online search engine. This may include the use of query augmentation to limit the results to a platform set, and identifying top level categories of the applications in the search results to stamp the category application queries with corresponding application categories in an offline manner. Such stamping can then be used to limit search results from that same search engine or another search engine in searching using query augmentation for applications from the other platform(s) to the stamped categories for the query.

Search engines are able to improve results of particular types of searches over time using feedback loops that improve the use of factor weights and other inputs to the searching techniques over time. However, when searching new types of targets, search engines may return results that are not as relevant to the query, because the search engines have not yet been fine-tuned with particular data pertaining to the new types of search items. This can be true when a search engine begins providing search results for a platform in which the search engine does not have significant experience. However, the category stamping technique discussed herein can allow the search engine's improved performance in searching for applications from a first platform set to be used by the computer system to also improve results in searching for applications from other platforms where the search engine may not yet have significant experience. Accordingly, this technique can allow the search engine's tuning in searching for applications from a first platform or set of multiple platforms to improve search results for applications from the second platform or set of platforms. Thus, the technique can improve a computer system's capability in searching for applications for other platforms using the search engine's data and experience from the first platform. Such improvements can result in more efficient and effective searching in the computer system, as fewer searches and less search-related browsing activities will be needed to arrive at listings of applications that are truly responsive to category application queries entered into the computer system.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, the processor, memory, storage, output device(s), input device(s), and/or communication connections discussed below with reference to FIG. 1 can each be at least a portion of one or more hardware components. Dedicated hardware logic components can be constructed to implement at least a portion of one or more of the techniques described herein. For example and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

FIG. 1 illustrates a generalized example of a suitable computing environment (100) in which one or more of the described aspects may be implemented. For example, one or more such computing environments can be used as a computing machine in an application store, a search service, and/or a client. Generally, various different computing system configurations can be used. Examples of well-known computing system configurations that may be suitable for use with the tools and techniques described herein include, but are not limited to, server farms and server clusters, personal computers, server computers, smart phones, laptop devices, slate devices, game consoles, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse types of computing environments.

With reference to FIG. 1, various illustrated hardware-based computer components will be discussed. As will be discussed, these hardware components may store and/or execute software. The computing environment (100) includes at least one processing unit or processor (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e. g. , ROM, EEPROM, flash memory), or some combination of the two. The memory (120) stores software (180) implementing cross-platform application query categories. An implementation of cross-platform application query categories may involve all or part of the activities of the processor (110) and memory (120) being embodied in hardware logic as an alternative to or in addition to the software (180).

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component (e.g., if the display device includes a touch screen). Also, processors have memory. The inventors hereof recognize that such is the nature of the art and reiterate that the diagram of FIG. 1 is merely illustrative of an exemplary computing device that can be used in connection with one or more aspects of the technology discussed herein. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The memory (120) can include storage (140) (though they are depicted separately in FIG. 1 for convenience), which may be removable or non-removable, and may include computer-readable storage media such as flash drives, magnetic disks, magnetic tapes or cassettes, CD-ROMs, CD-RWs, DVDs, which can be used to store information and which can be accessed within the computing environment (100). The storage (140) stores instructions for the software (180).

The input device(s) (150) may be one or more of various different input devices. For example, the input device(s) (150) may include a user device such as a mouse, keyboard, trackball, etc. The input device(s) (150) may implement one or more natural user interface techniques, such as speech recognition, touch and stylus recognition, recognition of gestures in contact with the input device(s) (150) and adjacent to the input device(s) (150), recognition of air gestures, head and eye tracking, voice and speech recognition, sensing user brain activity (e.g., using EEG and related methods), and machine intelligence (e.g., using machine intelligence to understand user intentions and goals). As other examples, the input device(s) (150) may include a scanning device; a network adapter; a CD/DVD reader; or another device that provides input to the computing environment (100). The output device(s) (160) may be a display, printer, speaker, CD/DVD-writer, network adapter, or another device that provides output from the computing environment (100). The input device(s) (150) and output device(s) (160) may be incorporated in a single system or device, such as a touch screen or a virtual reality system.

The communication connection(s) (170) enable communication over a communication medium to another computing entity. Additionally, functionality of the components of the computing environment (100) may be implemented in a single computing machine or in multiple computing machines that are able to communicate over communication connections. Thus, the computing environment (100) may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various aspects. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Category Application Search System

A. Overview of Category Application Search System

Figure 2:
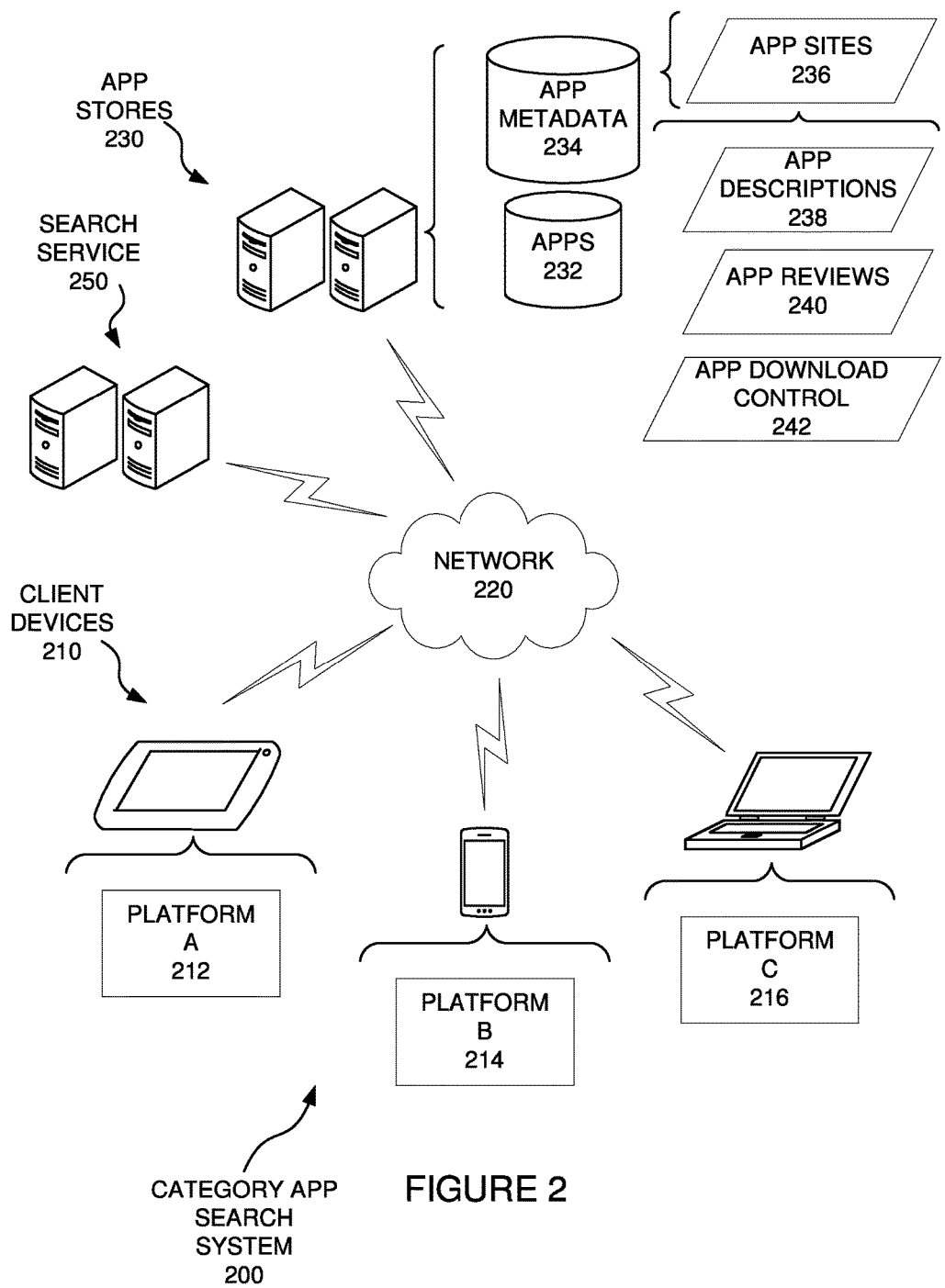
FIG. 2 is a schematic diagram of a category application search system.

FIG. 2 is a diagram of a category application search system (200) (which may also provide other searching, such as single application searching) in conjunction with which one or more of the described aspects may be implemented.

Communications between the various devices and components discussed with regard to FIG. 2 and elsewhere herein can be sent using computer system hardware, such as hardware within a single computing device, hardware in multiple computing devices, and/or computer network hardware. A communication or data item may be considered to be sent to a destination by a component if that component passes the communication or data item to the system in a manner that directs the system to route the item or communication to the destination, such as by including an appropriate identifier or address associated with the destination. Also, a data item may be sent in multiple ways, such as by directly sending the item or by sending a notification that includes an address or pointer for use by the receiver to access the data item. In addition, multiple requests may be sent by sending a single request that requests performance of multiple tasks.

Referring now to FIG. 2, components of the category application search system (200) will be discussed. Each of the components includes hardware, and may also include software. For example, a component of FIG. 2 or FIG. 3 can be implemented entirely in computer hardware, such as in a system on a chip configuration. Alternatively, a component can be implemented in computer hardware that is configured according to computer software and running the computer software. The components can be distributed across computing machines or grouped into a single computing machine in various different ways. For example, a single component may be distributed across multiple different computing machines (e.g., with some of the operations of the component being performed on one or more client computing devices and other operations of the component being performed on one or more machines of a server).

Referring still to FIG. 2, the category application search system (200) can include a plurality of client devices (210), which can each host a platform. The hosted platforms on the client devices (210) can include a variety of platforms on different devices. For example, the platforms may include one or more smartphone operating system platforms, one or more tablet operating system platforms, one or more laptop and/or desktop operating system platforms, etc. As illustrated in FIG. 2, the client devices (210) can include one client device (210) hosting a Platform A (212), another client device (210) hosting a Platform B (214), and another client device (210) hosting yet another Platform C (216). Different applications may each be supported on a different subset of the platforms (212, 214, and 216). As an example, each platform may include a different operating system and/or a different class of devices operating on the same operating system (smartphones and tablets may be considered different platforms even if both utilize the same general operating system, such as if some applications are able to run on the smartphones but not the tablets, some applications are able to run on the tablets but not the smartphones, and some applications are able to run on both the tablets and the smartphones).

The client devices (210) can each be connected to a network (220) through which the client devices (210) can communicate with available computing services. For example, such computing services may include application stores (230), from which the client devices (210) can retrieve applications (232) to install and run on the respective platforms (212, 214, or 216). Each application store (230) may also include application metadata (234). The application metadata (234) can include an application site (236) for each of the applications (232). Such an application site (236) may include data regarding the application, such as natural language data that can be provided to the client devices (210) to be presented on the client devices (210). For example, an application site may include natural language application descriptions (238) and natural language application reviews (240). For example, the content of the descriptions (238) may be provided by the publishers of the applications (232), while the content of the application reviews (240) may be provided by user profiles corresponding to users of the applications. Each application site (236) can also include an application download control (242) that can be selected by user input to download and install a corresponding application (232) on a client device (210). As an example, each application site (236) may be a Web page or some other type of digital document that is configured to be displayed by a client device (210).

The application store (230) may provide some application searching features to facilitate finding desirable application sites (236). Moreover, the category application search system (200) can include a separate search service (250). The search service (250) may be a general purpose search service, such as a search service that provides general Web searches. The search service (250) may also provide specific features for searching for applications (232) and corresponding application sites (236) on the application stores (230), as will be discussed more below. For example, the search service (250) may provide enhanced features to assist in providing effective answers to application search queries, such as category application search queries (which are searching for a category of applications) or single application search queries (which are searching for a single application). One or more of the search features discussed herein may also be incorporated into a search service that is specific to application searching, such as a search service incorporated into an application store (230).

B. Application Search Service

Figure 3:
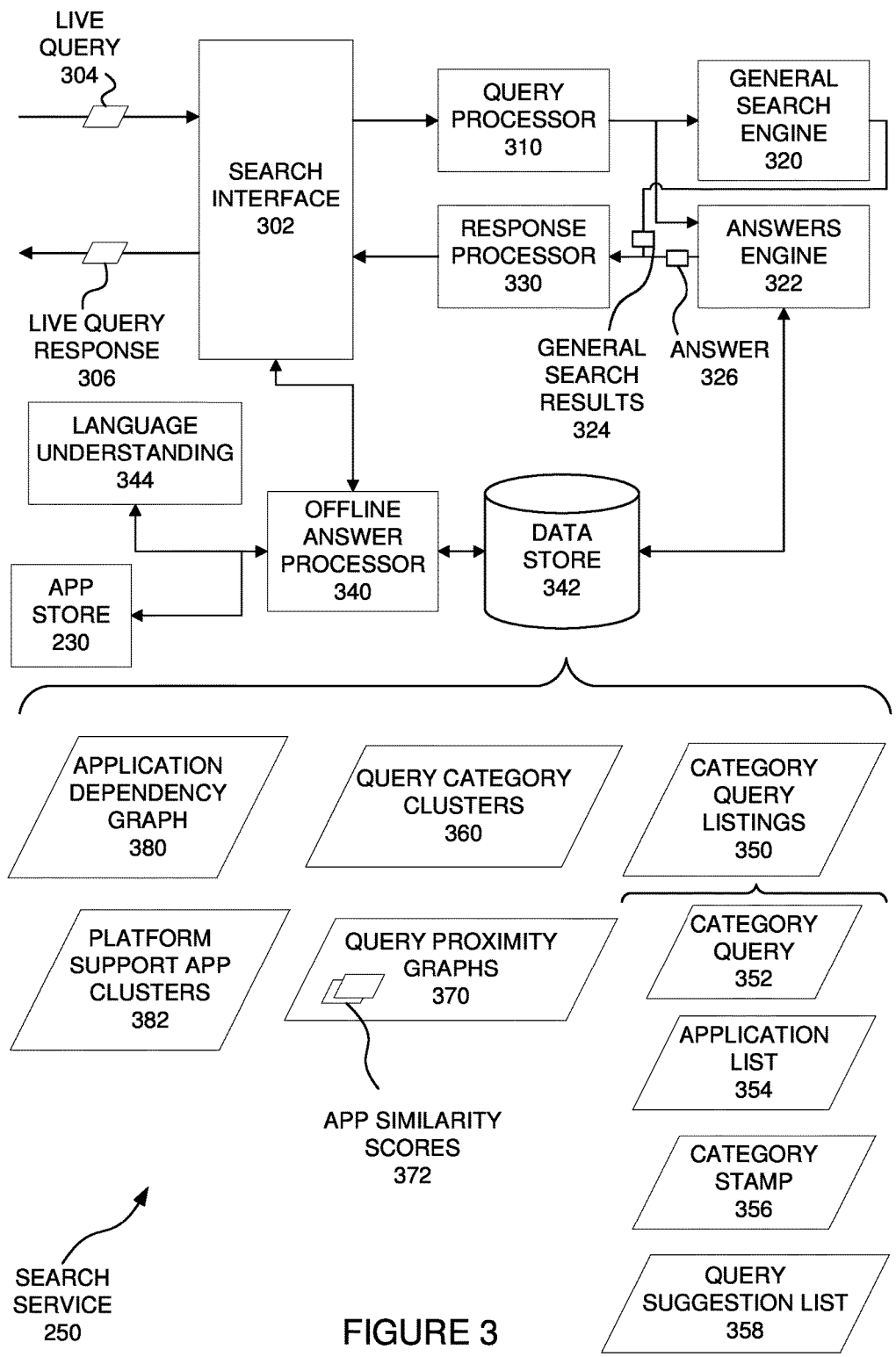
FIG. 3 is a block diagram of a search service from the application search system of FIG. 2.

Referring now to FIG. 3, some components of the search service (250) will be discussed in more detail. The search service (250) can include a search interface (302), through which search requests such as live queries (304) (and queries for offline processing) can be submitted to the search service (250), and through which responses such as live query responses (306) can be provided from the search service (250). For example, such queries (304) and responses (306) may come from client devices (210), such as those discussed above, and the live query responses (306) can be returned to such client devices (210).

The search service (250) can also include a query processor (310), which can process incoming queries (304), such as by performing pattern matching to determine whether each incoming query (304) includes a question to which the search service (250) can provide a targeted answer, in addition to or instead of general search results (such as general Web search results, which can include listings of Web pages and similar Web search results). The query processor (310) can pass the query (304) on to a general search engine (320).

The general search engine (320) can perform an online search, such as a search of Web pages associated with uniform resource locators (URL's). The general search engine (320) can use standard search engine techniques, such as accessing a search index (not shown) and searching for key words using the search index, and applying a ranking algorithm to the search results that are responsive to the live query (304). For example, the ranking algorithm may apply multiple weighted factors, and the weights may be trained using feedback loops to enhance search engine performance The search engine (320) may include a number of performance-enhancing features such as query expansion features, the use of a weighted model that has been trained using click data and other feedback data for ranking, and other search enhancing features. In response to a live query (304), the search engine (320) can return ranked general search results (324), such as a general listing of Web pages that are responsive to the live query (304).

Additionally, if the query processor (310) identifies the live query (304) as being a type of query to which a targeted answer can be provided, the query processor (310) can pass the query on to an answers engine (322). In response to such a query, the answers engine (322) can be configured to generate an answer. For example, the query processor (310) may recognize that a live query (304) includes a category application query, which is searching for computer applications within a category of such applications. For example, the query processor may compare each incoming live query (304) to patterns. If an incoming live query (304) matches a pattern for an answerable query, then the query processor (310) can identify the query as being an answerable query, and can pass the query (possibly after some processing) to the answers engine (322), possibly with additional metadata that identifies characteristics of the question being asked by the live query (304). As an example, a category application query may state, "search apps." Such a query can be identified as a query that is looking for applications for searching.

The answers engine (322) can respond to a live query (304) by providing an answer (326) for the identified question in the live query (304). For example, for a category application query, the answers engine (322) may provide a listing of applications that are identified as matching the category application query. As another example, for a single application query, the answers engine (322) may provide a listing of a single application that matches the query. Of course, such results may not always match exactly, but some of the features discussed herein can provide for more effective responses to such queries, which can yield better results.

The answer (326) and the general search results (324) can be included in a live query response (306) by a response processor (330) (such as by combining the general search results and the answer in a Web page), which can be responsive to the live query (304). For example, the live query response (306) may be in the form of a Web page that lists the general search results (324) as well as the answer (326). For example, the answer may be listed at the top of a page, and general search results (324) may follow. Each such listing may include identifying features for the listing (a title for an application, a thumbnail for the application, a control that can be selected to retrieve an application site for the application with a corresponding uniform resource locator (which may be a hyperlink using the title, a thumbnail link, or some other control), and/or other features. The live query response (306) may include additional features besides the general search results (324) and the answer, such as advertisements. Also, the general search results (324) and/or the answer (326) may include additional features, such suggested alternative queries that may be selected to run as follow-up live queries (304).

Referring still to FIG. 3, the search service (250) includes an offline answer processor (340), which is a computer component that processes data offline to prepare data in a data store (342) for efficient retrieval by the answers engine (322) in providing answers to live queries (304). As with other components discussed herein, the offline processor (340) may include multiple distributed components that work together to be considered a single computer component. As an example, the offline processor (340) can process data in preparation for providing responses to category application queries and/or single application queries (queries identified as searching for a single specific application). The offline answer processor (340) can utilize data from one or more application stores (230) and/or data from the general search engine (320) and/or answers engine (322), such as by submitting queries through the search interface (302) and receiving responses to those queries. Alternatively, some or all of the functions discussed herein as being performed offline by the offline processor (340) may be performed as part of a live response to a live query (304).

The offline answer processor (340) may also interact with other components, such as a language understanding component (344), which can provide responses to aid the offline answer processor (340) in processing natural language input, such natural language textual data in application descriptions (238) and application reviews (240). The language understanding component (344) may be an existing language understanding component (344), which may receive as input text to be analyzed as well as keywords and/or phrases for which matching words and/or phrases are to be identified in the text. The language understanding component (344) can search for language with meanings that correspond to the submitted keywords and/or phrases, such as by using pattern matching techniques supplemented with the use of linguistic tools such as dictionaries, synonym lists, and alternative phrasing identification techniques.

In performing offline processing, the offline processor (340) can generate, store, modify, and/or access various different data items in the data store (342). Such data items may be stored in various different types of data structures, such as database tables, tree structures, nodal graphs, and/or other structures. The data structures may each form a continuous structure in physical storage, or may form dispersed but related structures.

The data items in the data store (342) may include category query listings (350). Such listings can include a listing (350) for each of multiple category queries. Each list item can include text of the category query (352) itself, as well as an application list (354), which can include a list of applications that are responsive to the category query (352). Each category query listing (350) may also include a category stamp (356), which is a unit of data that indicates an application category associated with the category query. The category for a category stamp (356) may include one or more sub-queries. For example, a category stamp (356) may indicate Utilities and Lifestyle as categories of applications corresponding to the category query (352). This indicates that applications responsive to this category query (352) are likely to fall within the Utilities and Lifestyle application categories, and the category for this category query (352) is a custom category that is a combination of the Utilities and Lifestyle categories. Such category stamps (356) can be used by the offline answer processor (340) in generating the application list (354) for other corresponding category queries (352), such as corresponding category queries for different platform sets. Each category query listing (350) may also include a query suggestion list (358). The query suggestion list (358) is a list of suggested queries to be provided in answer to the category query (352), including suggested queries that may be presented with the live query response (306).

When receiving an answerable live query (304) for a category of applications, the answers engine (322) can match the live query (304) with a saved category query (352) in the data store (342), and can provide the corresponding application list (354) and query suggestion list (358) in the answer (326) to the live query (304). Additionally, the answers engine (322) may be informed of a type of platform being used by a client device (210) that submitted the live query (304). Each category query listing (350) can be associated with a particular category application query (352) and a particular set of one or more platforms.

The data in the data store (342) may also include data structures for use in generating and maintaining the category query listings (350). The use of such structures is discussed more below, but some such structures are briefly discussed here. For example, the data store can include query category clusters (360), which can group the category queries (352) into clusters, with each cluster having the same category stamp (356), and thus applications in its application list (354) that fall within the categories for the cluster. The actual data for such a query category cluster (360) may take various forms. For example, the cluster (360) may include pointers or addresses for the category query listings (350) for the category queries (352) in the cluster, or the query category cluster (360) may actually group the category query listings (350) or copies of such listings. The data in the data store (342) may also include query proximity graphs (370), which can include application similarity scores (372) for the queries in a group, such as for queries in a cluster of the query category clusters (360). The query category clusters (360) and the query proximity graphs (370) can be used in generating the query suggestion lists (358), as is discussed more below.

The data in the data store (342) can also include an application dependency graph (380), which can be a graph that indicates dependencies between applications (i.e., where one application is indicated as needing to have another application installed in order to run properly). The data may also include platform support application clusters (382). Each platform support application cluster (382) can indicate a group of applications that are supported by the same set of one or more platforms. For example, a first cluster may be supported by Platform A only, a second cluster may be supported by Platform B only, and a third cluster may be supported by both platforms A and B. Thus, the applications in the third cluster can run on either Platform A or Platform B, while the applications in the first and second clusters can only run on Platform A (for the first cluster) or Platform B (for the second cluster). The application dependency graph (380) can be used in assigning applications to the platform support application clusters (382), as is discussed more below.

The platform support application clusters (382) can be used in limiting the application lists (354) in the category query listings (350) to applications that are supported by a set of platform(s) corresponding to the particular cluster. Thus, when an incoming live query (304) identifies a platform of a requesting client device (210), the answers engine (322) can respond with an answer (326) that includes an application list (354) limited to applications that are indicated as being supported by that client device's platform. For example, the data store may include a separate category query listing (350) for each category query (352) and for each platform support application cluster (382). Indeed, the category query listings (350) for each platform support application cluster (382) may be maintained in a separate index in the data store (342). Alternatively, the category query listings (350) may be organized in some other manner to provide for retrieving application lists (354) limited to appropriate platform support application clusters (382), such as by each category query listing having multiple application lists (354), with one application list (354) for each platform support application cluster (382).

C. Enhanced Features for Providing Answers to Application Queries

Some enhanced features for providing answers to application queries (such as category application queries and/or single application queries) are discussed in more detail below. Such features relate to cross-platform application query categories, platform compatibility detection for applications, and application query suggestions.

1. Cross-Platform Application Query Categories

The offline answer processor (340) can implement cross-platform application query categories to use search results from applications for a first platform where searching is well-developed to train the searching of applications for a second platform where searching may not be as well developed. Referring to the flowchart of FIG. 4 and to the diagrams of FIGS. 2-3, the cross-platform application query categories technique illustrated in FIG. 4 may be performed for each of multiple application category queries, to yield application lists (354) for such queries. The category queries themselves may be extracted from search logs for a search engine, from manual entry, and/or from some other source. The technique can include the offline processor (340) retrieving (410) category application query responses from a search engine, with the responses limited to applications supported by a first set of one or more platforms, is referred to here as Platform A for convenience. For example, the search results may be limited using query augmentation. As an example of such augmentation, the results may be limited to a site that includes applications for Platform A. Also, additional query parameters may be passed to the search engine to limit the results to applications for Platform A. As a specific example, the following query may be submitted to a search engine to retrieve results or applications for car review applications from the IOS operating system from the associated online store located at itunes.apple.com: "car review apps site:itunes.apple.com". Alternatively, the search results may be limited in some other way, such as filtering results received from a search engine, or directing the query to a search site that only provides results for Platform A.

Figure 4:
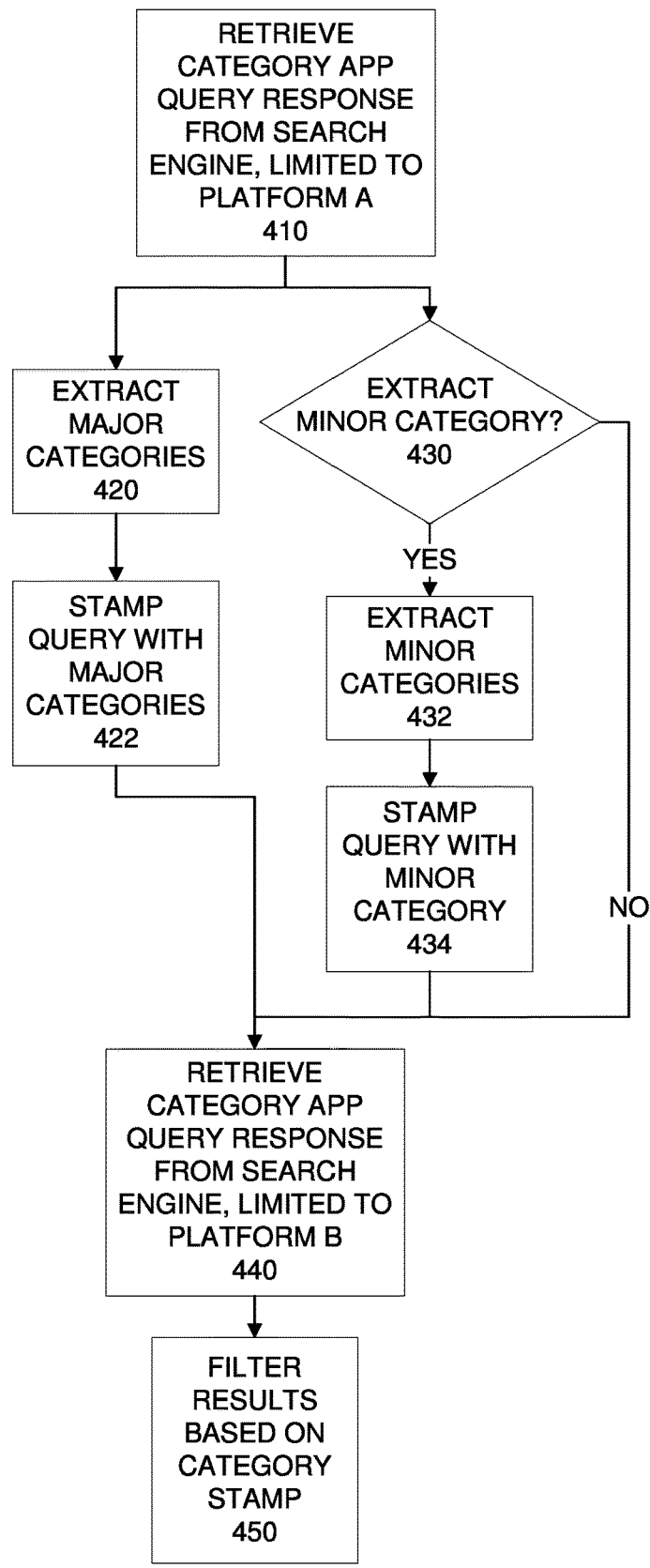
FIG. 4 is a flowchart of an example of a cross platform application query category technique.

The technique of FIG. 4 can also include extracting (420) major categories for the applications listed in the search results retrieved from the search engine (320). The major and minor categories discussed here can be categories indicated in an application store. Such application store categories may not be the same as categories for which category application queries are searching. For example, a category application query may search for car review applications, but there may not be such a category in the application store for the applications. Indeed, the categories of applications sought by category application queries are often narrower than the application categories maintained in application stores. The category stamps herein can use custom categories derived from the application store categories, as an example.

The application listings can be scored to determine the highest scoring application categories from the search results. In an example of such scoring, each category for which an application is listed in the top ten applications in the search results can get one point for each such application. Alternatively, a different scoring system may be used, or this scoring system may be modified. For example, a category may only get one-half point if the category query phrase (such as "car review") is present in the title of the corresponding application (or possibly just in the description of the application in some implementations). This is because having the description or title include the exact phrase being searched for may artificially lift the application's listing in the results, even if the query is not as relevant to the category query as other search results. To compare the text of the search to the application title, the offline answer processor (340) can use the title returned in the search results. Alternatively, to search for such phrases in the application descriptions, the offline answer processor may retrieve the application descriptions (238) from the application store (230), and the offline answer processor (340) may also retrieve application reviews (240) from the application store (230) as well. Copies of such application descriptions (238) and application reviews (240) may be maintained and periodically updated in the data store (342). The offline answer processor (340) can perform pattern matching techniques on the application titles or descriptions to identify the text of the search, or possibly phrases that are close matches to the search phrases, even if not exact matches.

As an example, in searching for "car review apps" as noted above, the top ten applications listed may include five applications in the application store's "lifestyle" category, with one of those applications having a phrase in the application title that matches the search query, giving a score of 4.5 for the "lifestyle" category. The applications may include one application in the "business" category, where that application's title includes a phrase matching the text of the query, so that the "business" category gets a score of 0.5. The listed applications may include two applications in the "shopping" category, neither of which includes the text of the query in the title, giving a score of 2.0 for the "shopping" category. The top ten results may also include one application from the navigation category and one from the news category, neither of which has the text of the query in the application title. Thus, the top two scoring categories are "lifestyle" with a score of 4.5 and "shopping" with a score of 2.0. Accordingly, "lifestyle" and "shopping" can be identified as the two major categories for the query, and the category stamp (356) for the "car review apps" category application query can be stamped with these two categories. The technique can also include stamping (422) the query with the major categories.

Additionally, the technique of FIG. 4 can include determining (430) whether to extract a minor category. For example, a minor category may only be extracted if there is at least one category that is not one of the two major categories, and that includes a phrase in the application title (or possibly that includes a phrase in the application description) that matches the text of the query. If there are one or more such categories, then the top scoring category meeting these criteria can be extracted (432) as a minor category. Additionally, the query can be stamped (434) with the minor category. This can include inserting an indication of the minor category in the category stamp (356). In the example above, the "business" category may be included as the minor category in the category stamp (356), so that the category stamp (356) for the "car review apps" category application query lists the "lifestyle" category as the top scoring major category, the "shopping" category as the second-highest scoring major category, and the "business" category as a minor category.

In assigning queries to category stamps (356), the offline answer processor (340) may perform additional processing. For example, the offline answer processor (340) may maintain a list of "antonym" categories that are not to appear together in category stamps (356). If two such categories are scored such that they would otherwise be included in a category stamp (356), then the lower scoring of the two categories can be excluded, and the next-highest scoring category can be included in its place. Also, if two categories have the same score, then a tie-breaking technique can be used. For example, the rank of the applications in the search results can be considered, with the category having the overall higher ranking applications in the search results winning the tie breaker and being considered to have the higher score.

The technique of FIG. 4 can also include retrieving (440) a category application query response from the search engine (or possibly even from a different search engine), with the search results limited to a different platform, indicated in FIG. 4 as Platform B. For example, if Platform B is applications for the OS X operating system, then the offline processor (340) may submit the following query to the search engine (320): "car review apps site:itunes.apple.com ?mt=12". Such a query can yield results listing applications that are compatible with the OS X operating system. However, the results may include listings of applications that are not particularly relevant to the "car review apps" category query. Accordingly, the offline processor (340) can filter (450) the results of applications for Platform B based on the category stamp (356) that was produced from the search results of applications supported on Platform A.

As an example of filtering to produce the list for Platform B, the offline processor (340) may analyze the top 50 results of applications for Platform B to fill the ten available slots for the application list (354) for Platform B. For example, the offline processor (340) can fill the ten available slots in the application list (354) with the top ranking applications listed in the search results for Platform B that fall within the highest scoring major category in the category stamp (356) extracted from the results of searching applications for Platform A. If additional slots are available in the application list (354) after taking all applications from the highest scoring category, then the offline answer processor (340) can take the listed applications from the second-highest scoring major category, in order of their ranking in the search results. If additional slots are still available in the application list (354), then the offline answer processor (340) can take the listed applications from the minor category if those listed applications include a phrase in the title or description of the application that matches the query phrase, again in order of the applications' ranking in the search results. Thus, the offline answer processor (340) can include listed applications and rank those applications in the application list (354) based on their ranking in the search results for Platform B, and based on how highly the associated category for the applications scored in extracting the category stamps from the search results for Platform A. Accordingly, in this manner the application list (354) for the category query listing (350) for the second platform (Platform B in the examples above) can be assembled.

That application list (354) can be used at runtime by the answers engine (322) to respond to live queries (304) that match the category query (352) in the category query listing (350), and that are identified as coming from a device that include Platform B, or that is otherwise limited to requesting applications supported by Platform B.

Also, some revisions may be made to the ordering of the application list (354). For example, the offline answer processor (340) can analyze the application reviews (240) for the applications, and can identify an application with the highest user review score according to a scoring technique. If that application is in one of the major categories and is not listed in the top 3 spots in the application list (354), then the listing for that highest review scoring application can replace the application listing in the third slot, and other applications can be shifted down by a slot to accommodate the upward move of this highest-scoring review application. The scoring for reviews can be based on the number of reviews, and on how highly those reviews ranked the application. Different formulas weighting the number of reviews and the review rating levels (for example, how many stars out of five, on average) may be utilized and modified as the model is fine-tuned.

The above description of this technique assumes that categories are the same between the applications for the two platforms (the categories for applications for Platform A are the same as the categories for applications for Platform B). If there are some differences, then different categories for the different platforms can be mapped to each other, so a category for applications for one platform can be considered to be the same as another category for applications for another platform, for purposes of this cross-platform application query categories technique.

2. Platform Compatibility Detection for Applications

As noted above, the search service (250) can respond to live queries (304) with live query responses (306) that are limited to applications indicated as being supported by a particular set of one or more applications. However, in some situations, it can be difficult to identify precisely which platforms support a particular application. This can be particularly true where the same query store includes applications for multiple platforms, and at least some of the applications are not supported by all the platforms. The technique discussed in the sub-section includes analyzing natural language data related to an application to assist in identifying which platform(s) support that particular application.

Figure 5:
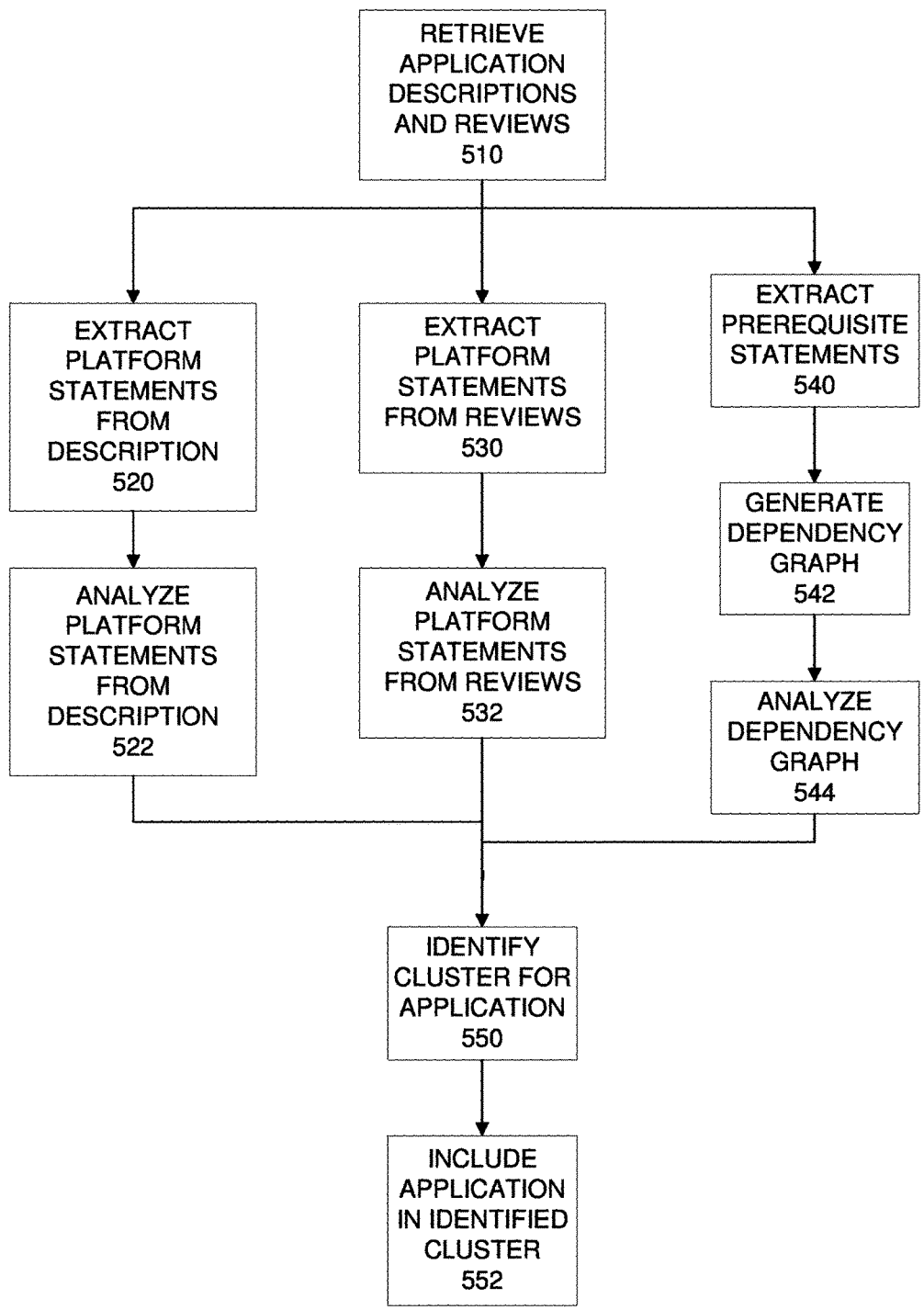
FIG. 5 is a flowchart of an example of an application platform compatibility detection technique.

This platform compatibility detection technique, illustrated in FIG. 5, can be performed for each application in a set of multiple applications. For example, the technique may be performed for applications listed in the application lists (354) in the data store (342) discussed above. The technique can include placing an application in a cluster corresponding to platform(s) that are determined to be supportive of the application. This information can be used in limiting the application lists (354) so that applications that are determined to not be supported by a particular platform can be excluded from answers to queries seeking applications for that platform.

Referring to FIG. 5 and still to FIGS. 2-3, the technique of FIG. 5 can include retrieving (510) application descriptions and application reviews. For example, the offline processor (340) can retrieve the application descriptions (238) and application reviews (240) from the application store (230). Alternatively, the offline processor (340) may retrieve the application descriptions (238) and application reviews (240) in some other manner, such as by retrieving cached copies maintained for a search engine.

The offline processor (340) can perform one or more of multiple different natural language-based analyses in identifying a platform support application cluster (382) to which an application is to be assigned.

In one such analysis, the offline processor (340) can extract (520) platform statements from an application description (238) for the application on an application site (236) in an application store (230). This extraction (520) can include performing pattern matching, to match statements in the application description (238) with pattern statements indicating that an application is or is not supported by a particular platform. For example, an application description (238) may state, "works great with Platform A", and this may be recognized as matching a general pattern "work[ ] . . . with [platform name]", indicating the pattern includes some form of the word "work" followed by the word "with" followed by the name of a platform. Some statements may indicate that an application does not work with a particular platform. For example, a statement, "works only with Platform A" indicates that the application does not work with a different platform, such as Platform B.

To assist in recognizing statements that may have the same meaning as a particular pattern, the offline answer processor (340) can submit the text of the description along with descriptions of the patterns to an existing language understanding component (344). The language understanding component (344) can be a component that has been configured and trained to assist in computer understanding of natural language text, and can be used to identify statements that have similar meanings to statements that are submitted to the language understanding component (344).

The technique of FIG. 5 can also include analyzing (522) the extracted platform statements from the application description (238), to determine whether the statements sufficiently indicate a set of one or more platforms that do and do not support the application. For example, this may include scoring the statements, including increasing a score for additional consistent statements and decreasing the score for statements that are determined to be inconsistent with other statements in the application description (238).

Another analysis that may be performed in identifying platform support for an application is based on application reviews (240). This can include extracting (530) platform statements from application reviews (240) for an application. This extraction (530) can be performed in the same manner as the extraction (520) from the application description (238). However, the pattern matching may be performed with different pattern statements because of the different nature of application reviews (240), as compared to application descriptions (238). For example, in the application reviews the statement, "I wish this would work on Platform B" could indicate that the application is not supported by Platform B, and would likely be included in application reviews (240), but would be unlikely to appear in an application description (238). However, some statements may be similar to those found in the application description (238). For example, an application review (240) may state, "works great on Platform A", indicating that the application is supported by Platform A. The extracted platform statements from the application reviews (240) can also be analyzed (532), to determine whether the statements sufficiently indicate a set of one or more platforms that do and/or do not support the application. This analysis (532) can be similar to the analysis (522) of the statements from the application description (238). The analysis (522) and/or the analysis (532) can include using a well-known technique known as sentiment analysis to infer whether or not a certain application works on a given platform. For example, the extracted platform statements may include a number of statements indicating that Application X does not work on Platform B, such as the following: "app X does not work on my platform B", "I tried to install app X on platform B and it keeps failing on me!", etc. Sentiment analysis can be used to probabilistically infer that "app X is not compatible with platform B with a confidence of K %", for example.

Yet another analysis that may be performed in identifying platform support for an application is based on prerequisite applications. Specifically, the technique can include extracting (540) natural language prerequisite statements and/or other statements indicating that one or more applications are needed to properly run the current application. For example, an application description (238) or an application review (240) may state, "this application only works if you already have Application Y." Such statements can be extracted (540) and analyzed in the same manner as platform support statements are extracted and analyzed (such as by using pattern matching, sentiment analysis, and/or other extraction and analysis techniques). These prerequisite statements can be used to generate (542) the application dependency graph (380) (and the generating (542) can include the analysis of the extracted prerequisite statements), which is a data structure that indicates prerequisite dependencies (which can include co-requisite dependencies where two applications must both be installed for either application to work properly). The data structure of the dependency graph (380) may be any of various different types, such as a separate nodal graph, or merely metadata included in an existing listing for each application, which indicates other applications upon which that application depends. One or more entries for the current application in the dependency graph (380) can be analyzed (544) to identify applications upon which the current application depends. Additionally, the analysis (544) can include identifying the platform support application cluster (382) to which the prerequisite application(s) belong. If the prerequisite application(s) belong to a support application cluster (382) that indicates lack of support by a particular platform, then this indicates that the current application is also not supported by that platform.

The technique of FIG. 5 can further include considering the results of the analyzing (522), the analyzing (532), and the analyzing (544) to identify one or more platforms that support the current application and/or one or more platforms that do not support the current application. This can indicate a corresponding set of platforms that correspond to a cluster to which the application can be assigned. For example, there may be three clusters. One cluster may be supported by Platform A only, another by Platform B only, and another supported by Platform A and Platform B. The identifying (550) may consider any perceived inconsistencies between the results of analyzing (522), the analyzing (532), and the analyzing (544), and such inconsistencies may be resolved by applicable rules. For example, it may be that a result of the dependency graph analysis (544) indicating that an application is not supported by a platform may trump a result of either of the other analyses (522 and 532) indicating that the application is supported by the platform. As another example, in the case of an inconsistency, the majority may prevail, and if no majority is present on an indication, then the application may not be assigned to a cluster, or may be assigned to a general cluster that is not limited to a particular set of one or more platforms.

The technique of FIG. 5 can also comprise including (552) the application in the identified cluster (382). This can include inserting in a data structure in the data store (342) data indicating that the current application is supported only by a set of applications associated with its cluster. Such clustering can be used to limit the application lists (354) to including only applications that are supported by a particular platform corresponding to the category query listing (350).

3. Application Query Suggestions

As noted above, the search service (250) can return a query suggestion list (358) in an answer (326) to a live query (304). Such a query suggestion list (358) can be associated with a particular query listing (350) in the data store (342), and may be retrieved by the answers engine (322) when responding to a live query (304). This subsection discusses techniques for generating such a query suggestion list (358) for a category application query.

Figure 6:
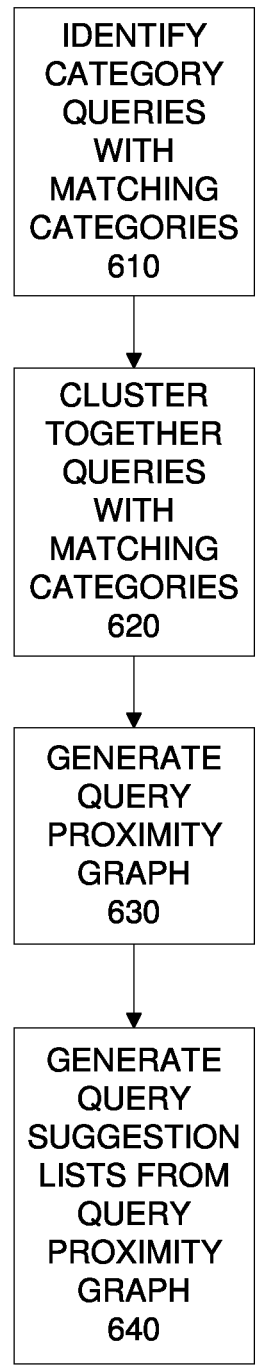
FIG. 6 is a flowchart of an example of an application query suggestion technique.

Referring to FIG. 6 and still to FIGS. 2-3, this technique can use the categories in the category stamp (356) discussed above for corresponding category queries (352). The category queries (352) may be clustered (620) together in a query category cluster (360) in response to identifying (610) the category queries (352) in the cluster (360) that have matching categories in their category stamps (356) (such as all the same categories, or the same major (two highest scoring) categories in the category stamp (356)). This can be done by parsing through the category stamps (356) in the category query listings (350), and saving indications of all the category queries (352) with matching categories in the category stamps (356).

The technique of FIG. 6 can also include generating (630) a query proximity graph (370) for each cluster (360) of queries. For example, this can include building a data structure that indicates an application similarity score (372) for each pair of multiple pairs of queries in a cluster (360). The score (372) for a pair can be based at least in part on a number of applications that the pair has in common in the application lists (354) for the two category queries (352). Also, generating an application similarity score (372) can include giving a greater score increase for common applications in a major category than for common applications in a minor category.

The technique of FIG. 6 can also include generating (640) query suggestion lists (358) using the query proximity graph (370). This generating (640) can include, for a particular category query listing (350), identifying the highest scores (372) in a query proximity graph (370) for that query's cluster (360) for pairs of queries (352) that include that particular query (352). For example, the offline answer processor (340) may locate the three such scores that are the highest. The offline answer processor (340) can identify the other category queries (352) (besides the particular query (352)) in those pairs, and include those other category queries (352) in the query suggestion list (358) corresponding to the particular query (352).

III. Cross-Platform Application Query Category Techniques

A cross platform application query category technique will now be discussed with reference to FIG. 7. The technique can be performed in a computing environment. For example, the technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable memory may have computer-executable instructions embodied thereon that, when executed by at least one processor, cause at least one processor to perform the technique. The technique discussed below may be performed at least in part by hardware logic.

Figure 7:
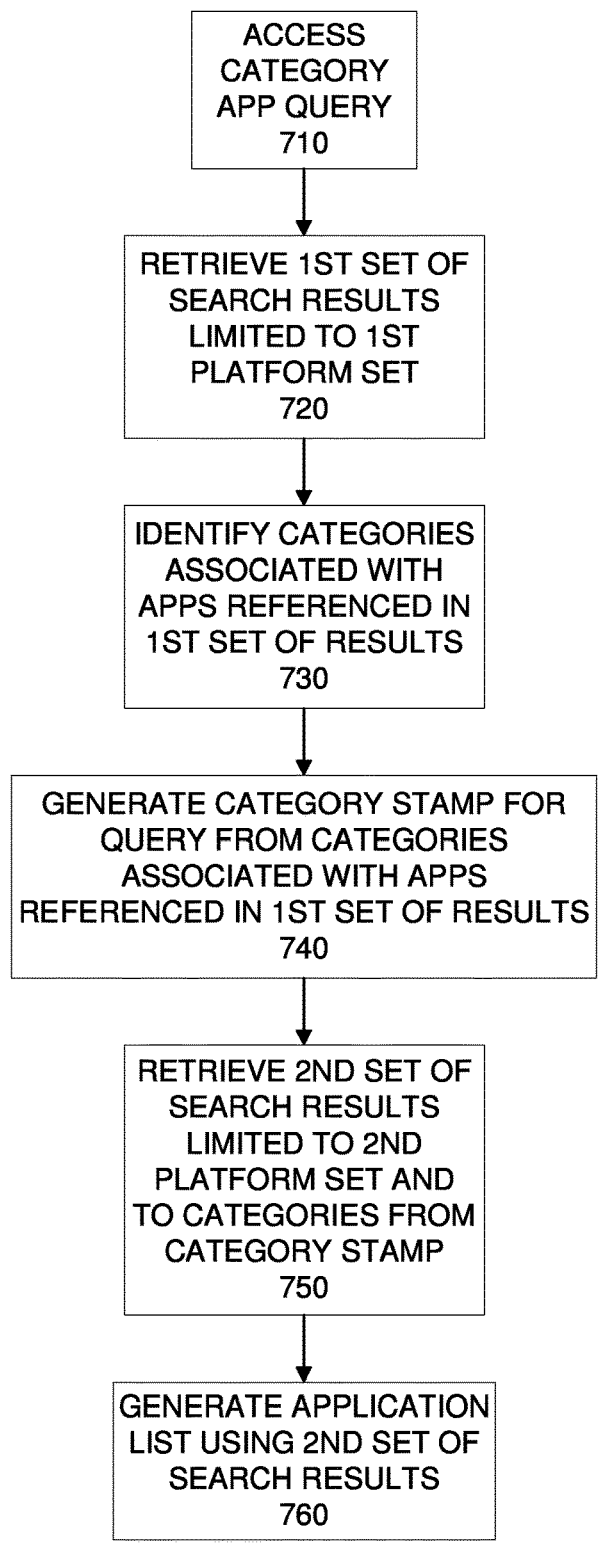
FIG. 7 is a flowchart of a cross-platform application query category technique.

Referring to FIG. 7, a cross platform application category technique will be described with reference to it being performed for a single query. However, the technique of FIG. 7 can be performed for multiple queries. For example, this may be done by repeating the entire technique of FIG. 7 in series for multiple queries. Alternatively, some or all of the acts depicted in FIG. 7 may be performed in parallel for multiple queries. Also, one or more of the acts may be performed for each of multiple queries in series, followed by performing another one of the acts of FIG. 7 in series for multiple queries. Also, the technique may be performed with some other combination of serial and/or parallel performance of the acts of FIG. 7.

The technique of FIG. 7 can include accessing (710) a category application query. A limited first set of search engine results can be retrieved (720) from running the query. The limited first set of results can be limited to applications associated with a first set of one or more application platforms, with the first set of one or more application platforms including one or more application platforms that is each a computing platform that is configured to run applications. For example, the search results may be limited by requesting that a search engine limit the results when running the query, filtering results returned from the search engine, or some other limiting technique. The technique of FIG. 7 can further include identifying (730) categories associated with applications referenced in the limited first set of results. For example, this can include identifying one or more of an application store's categories that is associated with each of the applications in metadata available from the application store. A category stamp can be generated (740) for the query, from categories associated with applications referenced in the first set of results. For example, the generating (740) can include generating and comparing scores that are based at least in part upon quantities of applications in the limited first set of results that are associated with each of a plurality of available categories. The technique of FIG. 7 can further include retrieving (750) a limited second set of search engine results from running the query. The limited second set of results can be limited to applications associated with a second set of one or more application platforms. The second set of one or more application platforms can be different from the first set of one or more application platforms, with the second set comprising one or more application platforms that is each a computing platform that is configured to run applications. Also, the limited second set of results can be limited to applications in a category corresponding to the category stamp for the query. For example, this limiting may include limiting the results to a combination of multiple categories that together form a custom category of the category stamp. The technique of FIG. 7 can include generating (760) an application list for the query using the limited second set of search engine results. The application list can include references to applications from the limited second set of search engine results for the query. Also, this general technique of FIG. 7 discussed in this paragraph can be utilized with any combination of the features that are each discussed in a paragraph below.

The generating (760) of the application list can include ranking the application list. Also, this ranking can be based at least in part on the category stamp for the query. Also, the ranking can be based at least in part on a ranking from search engine results retrieved from a search engine running the query.

The category corresponding to a category stamp for the query can be a custom category that is different from categories in an application store that provides applications for use in the first set of one or more application platforms (such as by being a combination of multiple categories corresponding to categories in the application store). For example, the custom category can include two (and possibly more) sub-categories that is each a top level category from the application store that provides applications for use in the first set of one or more application platforms.

The query can be a stored query, and the technique of FIG. 7 may further include receiving a live query. The technique can also include responding to the live query by matching the live query to the stored query, with the matching stored query having a generated application list. The technique can also include responding to the matching by returning the generated application list for the matching query as an answer to the live query.

Although the subject matter has been described in language specific to structural features and/or methodological acts, it is to be understood that the subject matter defined in the appended claims is not necessarily limited to the specific features or acts described abo Rather, the specific features and acts described above are disclosed as example forms of implementing the claims.

We claim:

1. A computer system comprising:
at least one processor; and
memory comprising instructions stored thereon that when executed by at least one processor cause at least one processor to perform acts for cross-platform application query categorization, with the acts comprising:
performing a category stamping technique that uses the computer system's searching capability in searching for computer applications associated with a first set of one or more computer application platforms to improve the computer system's searching capability in searching for computer applications associated with a second set of one or more computer application platforms, with the category stamping technique comprising:
accessing a plurality of computerized category application queries;
retrieving a limited first set of computerized search engine results from running the queries, with the limited first set of results being limited to applications associated with the first set of one or more application platforms, with the first set of one or more application platforms being one or more platforms that is each a computing platform that is configured to run computer applications;
identifying categories associated with applications referenced in the limited first set of results;
generating computerized category stamps for the queries, with the generating of the category stamps comprising, for each of the queries, generating and comparing scores that are based at least in part upon quantities of applications in the limited first set of results that are associated with each of a plurality of available categories;
retrieving a limited second set of computerized search engine results from running the queries, with the limited second set of results being limited to applications associated with the second set of one or more application platforms, with the second set of one or more application platforms being one or more application platforms that is each a computing platform that is configured to run computer applications and is different from the first set of one or more application platforms, and with the limited second set of results being limited, for each of the queries, to applications in a category corresponding to a category stamp for that query, with the category stamp for that query being one of the generated category stamps; and
for each of the queries, generating a computerized application list for the query using the limited second set of search engine results, with the application list comprising references to applications from the limited second set of search engine results for that query.

2. The computer system of claim 1, wherein generating an application list for each of the queries comprises ranking the application list.

3. The computer system of claim 2, wherein the ranking of an application list for each query is based at least in part on a category stamp for that query.

4. The computer system of claim 3, wherein the ranking for each query is based at least in part on a ranking from search engine results retrieved from a search engine.

5. The computer system of claim 1, wherein for one of the queries, the category corresponding to a category stamp for that query is a custom category that is different from categories in an application store that provides applications for use in the first set of one or more application platforms.

6. The computer system of claim 5, wherein the custom category comprises two sub-categories that is each a top level category from the application store that provides applications for use in the first set of one or more application platforms.

7. The computer system of claim 1, wherein the queries are stored queries, and wherein acts further comprise:
receiving a live query;
in response to receiving the live query, matching the live query to a matching query of the stored queries, with the matching query having a generated application list of the generated application lists; and
in response to matching the live query to the matching query, returning the generated application list for the matching query as an answer to the live query.

8. A computer-implemented method, comprising the following acts:
performing a category stamping technique that uses a computer system's searching capability in searching for computer applications associated with a first set of one or more computer application platforms to improve the computer system's searching capability in searching for computer applications associated with a second set of one or more computer application platforms, with the category stamping technique comprising:
accessing, via a computer system, a category application query;
retrieving, via the computer system, a limited first set of search engine results from running the query, with the limited first set of results being limited to applications associated with the first set of one or more application platforms, with the first set of one or more application platforms comprising one or more application platforms that is each a computing platform that is configured to run applications;

identifying, via the computer system, categories associated with applications referenced in the limited first set of results;

generating, via the computer system, a category stamp for the query, with the generating of the category stamp comprising generating and comparing scores that are based at least in part upon quantities of applications in the limited first set of results that are associated with each of a plurality of available categories;

retrieving, via the computer system, a limited second set of search engine results from running the query, with the limited second set of results being limited to applications associated with the second set of one or more application platforms, with the second set of one or more application platforms being different from the first set of one or more application platforms, with the second set comprising one or more application platforms that is each a computing platform that is configured to run applications, and with the limited second set of results being limited to applications in a category corresponding to the category stamp for the query; and generating, via the computer system, an application list for the query using the limited second set of search engine results, with the application list comprising references to applications from the limited second set of search engine results for the query.

9. The method of claim 8, wherein generating the application list for the query comprises ranking the application list.

10. The method of claim 9, wherein the ranking of the application list for the query is based at least in part on the category stamp for the query.

11. The method of claim 10, wherein the ranking for each query is based at least in part on a ranking from search engine results retrieved from a search engine.

12. The method of claim 8, wherein the category corresponding to the category stamp for the query is a custom category that is different from categories in an application store that provides applications for use in the first set of one or more application platforms.

13. The method of claim 12, wherein the custom category comprises two sub-categories that is each a top level category from the application store that provides applications for use in the first set of one or more application platforms.

14. The method of claim 8, wherein the query is a stored query, and wherein acts further comprise:

receiving a live query;

in response to receiving the live query, matching the live query to the stored query, wherein the stored query is stored in a data structure comprising multiple stored queries; and in response to matching the live query to the stored query, returning the generated application list for the stored query as an answer to the live query.

15. One or more computer-readable memory having computer-executable instructions embodied thereon that, when executed by at least one processor, cause at least one processor to perform acts comprising:

performing a category stamping technique that uses a computer system's searching capability in searching for computer applications associated with a first set of one or more computer application platforms to improve the computer system's searching capability in searching for computer applications associated with a second set of one or more computer application platforms, with the category stamping technique comprising:

accessing a plurality of stored computerized category application queries;

retrieving a limited first set of computerized search engine results from running the stored queries, with the limited first set of results being limited to applications associated with the first set of one or more application platforms, with the first set of one or more application platforms being one or more application platforms that is each a computing platform that is configured to run computer applications;

identifying categories associated with applications referenced in the limited first set of results;

generating computerized category stamps for the stored queries, with the generating of the category stamps comprising, for each of the stored queries, generating and comparing scores that are based at least in part upon quantities of applications in the limited first set of results that are associated with each of a plurality of available categories;

retrieving a limited second set of computerized search engine results from running the stored queries, with the limited second set of results being limited to applications associated with the second set of one or more application platforms, with the second set off one or more application platforms being different from the first set of one or more application platforms, with the second set of one or more application platforms being one or more application platforms that is each a computing platform that is configured to run computer applications, and with the limited second set of results being limited, for each of the stored queries, to applications in a category corresponding to a category stamp for that stored query, with the category stamp for that stored query being one of the generated category stamps;

for each of the stored queries, generating a computerized application list for the stored query using the limited second set of search engine results, with the application list comprising references to applications from the limited second set of search engine results for that stored query;

receiving a computerized live query;

in response to receiving the live query, matching the live query to a matching query of the stored queries, with the matching query having a generated application list of the generated application lists; and in response to matching the live query to the matching query, returning the generated application list for the matching query as an answer to the live query.

16. The one or more computer-readable memory of claim 15, wherein generating an application list for each of the stored queries comprises ranking the application list.

17. The one or more computer-readable memory of claim 16, wherein the ranking for each stored query is based at least in part on a category stamp for that stored query.

18. The one or more computer-readable memory of claim 16, wherein the ranking for each stored query is based at least in part on a ranking from search engine results retrieved from a search engine.

19. The one or more computer-readable memory of claim 15, wherein for one of the stored queries, the category corresponding to a category stamp for that stored query is a custom category that is different from categories in an application store that provides applications for use in the first set of one or more application platforms.

20. The one or more computer-readable memory of claim 19, wherein the custom category comprises two sub-categories that is each a top level category from the application store that provides applications for use in the first set of one or more application platforms.

* * * * *